United States Patent [19]

Baker

[11] 3,986,946
[45] Oct. 19, 1976

[54] HYDROCARBON CRACKING CATALYST AND PROCESS

[75] Inventor: Richard William Baker, Ellicott City, Md.

[73] Assignee: W. R. Grace & Co., New York, N.Y.

[22] Filed: Dec. 17, 1973

[21] Appl. No.: 425,427

Related U.S. Application Data

[63] Continuation of Ser. No. 273,147, July 19, 1972, abandoned.

[52] U.S. Cl. .............................. 208/115; 208/116; 252/417; 252/441
[51] Int. Cl.² ................... C10G 11/08; B01J 27/06; B01J 8/24
[58] Field of Search ........... 208/115, 119, 116, 117, 208/120

[56] References Cited
UNITED STATES PATENTS

| | | | |
|---|---|---|---|
| 2,901,440 | 8/1959 | Wilson | 252/441 |
| 3,129,189 | 4/1964 | Wilson et al. | 252/441 |
| 3,213,038 | 10/1965 | Chomitz | 252/450 |
| 3,271,418 | 9/1966 | Plank et al. | 208/120 |
| 3,404,097 | 10/1968 | Wilson et al. | 252/441 |
| 3,425,956 | 2/1969 | Baker et al. | 252/455 |
| 3,650,988 | 3/1972 | Magee et al. | 252/451 |
| 3,686,121 | 8/1972 | Kimberlin et al. | 252/455 |
| 3,838,040 | 9/1974 | Ward | 208/111 |

*Primary Examiner*—Delbert E. Gantz
*Assistant Examiner*—G. E. Schmitkons
*Attorney, Agent, or Firm*—Arthur P. Savage

[57] ABSTRACT

A hydrocarbon cracking process using a catalyst composition which contains a silica-magnesia or silica-magnesia-fluoride composite in combination with a substantial amount of clay. The catalyst yields desirable selectivity in combination with superior regeneration characteristics. In a preferred embodiment, the catalyst composition also contains a crystalline aluminosilicate zeolite.

2 Claims, No Drawings

HYDROCARBON CRACKING CATALYST AND PROCESS

This is a continuation of application Ser. No. 273,147, filed 7/19/72, now abandoned.

The present invention relates to hydrocarbon cracking catalysts, and more specifically to novel semi-synthetic silica-magnesia or silica-magnesia-fluoride based cracking catalysts which possess both a high degree of activity and a desired low equilibrium surface area.

It is generally known that silica-magnesia and silica-magnesia-fluoride composites find utility as hydrocarbon cracking catalysts. These catalysts process high cracking activity, good $C_5^+$ gasoline selectivity, and in addition, produce exceptionally high yields of light cycle oils.

While conventional silica-magnesia and silica-magnesia-fluoride based catalysts exhibit several desirable qualities, it is also found that these catalysts generally possess an exceptionally high equilibrium surface area, normally in the area of 300–400 m²/g. This high surface area renders the catalyst difficult to strip of hydrocarbons subsequent to a cracking cycle. Consequently, large amounts of hydrocarbon is carried over into the regeneration or coke-burnoff cycle, which in turn leads to excessively high temperatures in the regenerator. To date the only practical method for limiting temperatures during regeneration of typical silica-magnesia or silica-magnesia-flouride based catalyst involves the use of a quenching water spray. However, it is frequently found that the use of water quench during regeneration interferes with the coke burnoff operation.

It is therefore an object of the present invention to provide improved silica-magnesia and silica-magnesia-fluoride based cracking catalysts.

It is a further object to provide silica-magnesia and silica-magnesia-fluoride cracking catalysts which possess a desired degree of activity and selectivity in combination with a relatively low surface area.

It is another object to provide a crystalline aluminosilicate zeolite containing low surface area silica-magnesia or silica-magnesia-fluoride catalyst which may be readily and completely regenerated in conventional hydrocarbon processing equipment.

These and still further objects of the present invention will become readily apparent to one skilled in the art from the following detailed description and examples.

Broadly, our invention contemplates a hydrocarbon conversion catalyst which comprises a composite of silica-magnesia or silica-magnesia-fluoride in combination with clay, and optionally, crystalline aluminosilicate zeolite.

More specifically, we have found that a highly active, relatively low surface area silica-magnesia or silica-magnesia-fluoride containing cracking catalyst may be prepared by combining from about 20 to 50% by weight clay with a silica-magnesia or silica-magnesia-fluoride composite which in turn comprises about 60 to 92% silica; 8 to 40% magnesia; and 0 to 6% fluoride. It is also contemplated that the catalyst composition may contain from about 0.1 to 20% by weight of a crystalline aluminosilicate zeolite such as synthetic faujasite. The present catalyst is further characterized by an initial, i.e., fresh, surface area of from about 300 to 600 m²/g and an equilibrium surface (after heating to 1550° F for 3 hours) of about 125 to 300 m²/g.

Briefly, the catalysts of the present invention are prepared by first combining an aqueous slurry of clay, and if desired, zeolite, with an aqueous solution of alkali metal silicate, preferably sodium silicate, and subsequently gelling the silicate by addition of mineral acid or carbon dioxide. After gelling the silicate-clay mixture, magnesia is incorporated in the form of a hydrated slurry, and if desired, fluoride in the form of hydrogen fluoride is added. The composite is subsequently filtered, washed, spray dried, and again washed prior to final drying.

The clay used in the present invention is preferably kaolin having an average particle size of from about 0.5 to 2.0 microns. In addition to kaolin clay, other clays such as bentonite, halloysite, montmorillenite, attapulgite, as well as thermally or chemically treated or activated derivatives thereof may be utilized. As indicated above, the clay component is used in the preparation of the present catalyst in amounts ranging from about 20 to about 50% by weight of the finished catalyst composition.

The crystalline aluminosilicate zeolites which may be used in the preparation of our catalysts are generally defined as stable zeolites having pore openings of about 6 to 15 A. The preferred zeolites are synthetic faujasites and modified forms of synthetic faujasite which possess a silica to alumina ratio of about 2.5 to 6, and which possess thermal stabilities on the order of 1500° to 1700° F. Typical zeolites which may be used are calcined rare earth exchanged type X and type Y prepared in accordance with the teaching of U.S. Pat. No. 3,402,996. Hydrogen exchanged faujasite which has been further treated to enhance the stability thereof, such as 2-14US which is described in U.S. Pat. No. 3,293,192, may be used to advantage. Furthermore, faujasite which has been exchanged with a combination of hydrogen and/of polyvalent metal ions selected from Group III through Group VIII of the Periodic Table may be utilized in our catalyst compositions.

The silicate component of the present catalyst is normally sodium silicate which is used in a form of a dilute aqueous solution containing from about 3 to about 6% by weight silicate ($SiO_2$). While the present description generally refers to the use of sodium silicate, it is to be understood other alkali metal silicates such as potassium silicate may also be employed. Normally, sufficient silicate is utilized so as to impart a total of from about 40 to about 75% by weight $SiO_2$ in the finished catalyst composition.

The magnesia (MgO) used in preparing the present catalyst is normally obtained in the calcined form. The calcined magnesia is combined with water in the presence of a small amount of mineral acid, normally sulfuric acid, and thereby converted to a hydrated form. Generally, it is found that a magnesia slurry containing from about 5 to about 30% by weight MgO in water which has been hydrated in the presence of from about 10 to about 50% weight sulfuric acid is suitable for the preparation of the present catalyst.

As indicated above, the present catalyst may or may not contain fluoride. When fluoride is utilized, it is generally preferred to add the fluoride in the form of hydrogen fluoride to a combination of the gelled silicate and magnesia components. However, it is also contemplated hydrogen fluoride may be added to the slurried magnesia hydrate prior to addition thereof to the gelled silicate. When hydrogen fluoride is added to the magnesia slurry, it is generally found that precipitated magnesium fluoride is formed. Generally speaking, when fluoride is utilized in the formation of the present compositions, sufficient fluoride is added to impart from about 1.0 to about 3.0% by weight F based on the weight of the finished catalyst.

Generally, it is preferred to conduct the gelation of silicate component by addition of carbon dioxide, however, it is also contemplated that mineral acids such as sulfuric acid and hydrochloric acid may be used to gel the alkali metal silicate if desired. When $CO_2$ is used as the gelling agent, the sodium carbonate which is formed during the gelling reaction is decomposed by the addition of mineral acid, preferably sulfuric acid, which is added in amounts to reduce the pH of the gel slurry to about 3.0. The $CO_2$ which is liberated from the reaction mass is preferably collected and reused in a subsequent gelation procedure.

While it is generally preferred to add the clay and the zeolite ingredient to the alkali metal silicate solution, it is also contemplated that clay and zeolites may be added to the composite along with the magnesia component. However, it is generally found that the most uniform dispersion of clay throughout the catalyst is obtained when the clay is added to the alkali metal silicate prior to the gelatin thereof.

In a typical process for preparing catalyst of the present invention, an aqueous slurry of clay is added to an aqueous sodium silicate solution and uniformily admixed therewith. The clay-silicate slurry is then admixed with the carbon dioxide to cause the gelation of the silicate component. The gelled mixture is then preferably aged for a period from about 15 to 120 minutes at a temperature at from about 100° to 120° F. Subsequent to aging, the mixture is then acidified by the addition of sulfuric acid during which the pH of the gel mixture is adjusted to about 3 to 4. During the addition of sulfuric acid, carbon dioxide is liberated and preferably collected and recycled to the initial gelation step.

A magnesia slurry, which comprises magnesia dispersed in dilute mineral acid, is then prepared. This magnesia slurry comprises hydrated magnesia and water which is then intermixed with the gelled clay-silicate slurry mixture. This mixture is then aged for a period of from about 1 to 3 hours at a temperature of from about 125° to 165° F. At this point the fluoride ingredient is added, if required, in the form of hydrogen fluoride. Subsequent to the addition of the hydrogen fluoride (HF), the composite is then filtered to remove excess water and subsequently reslurried with water and spray dried. The spray dried product which then will possess a particle size on the order of 10 to 100 microns is then collected, reslurried with water, and is aged for about 1 to about 4 hours at a temperature of from about 145° to 185° F. The aged, spray dried catalyst is then reslurried in $(NH_4)_2SO_4$ solution and washed and finally dried.

It is found that the catalyst composites prepared in accordance with the present invention will process a high degree of hydrocarbon cracking activity and will also exhibit good thermostability and attrition resistance when subjected to hydrocarbon cracking conditions. The present catalyst is particularly characterized by possessing a desired equilibrium surface area on the order of from about 225 to 450 m²/g and a pore volume in the range of from about 0.4 to 0.8 cc/g.

Having described the basic aspects of the present invention, the following examples are given to illustrate specific embodiments thereof.

EXAMPLE 1

A silica-magnesia-fluoride catalyst containing 30% by weight clay was prepared by the following procedure.

7220 g of kaolin clay was added to 45 gallons of sodium silicate solution which contained 18.5 g per liter $Na_2O$ and 61.2 g per liter $SiO_2$. The slurry was maintained at a temperature of 125° F. and pumped at a rate of 1 gallon per minutes through a reaction coil into which carbon dioxide was passed under pressure. The $CO_2$ stream was added at a rate such that gelation of the stream exiting from the reaction zone occurred in 15 seconds at the 125° reaction temperature.

The resulting silica-gel-clay slurry was then aged for about 1 hour at 125° F. The slurry was then combined with 4600 milliliters of 39% sulfuric acid which lowered the pH to 3.0.

A dehydrated magnesia slurry was prepared by combining 2340 g calcined MgO and 3 liters of water at 135° F. Subsequently, additional 4 liters of water was added along with 1350 milliliters of 39% sulfuric acid. This slurry was then combined with the above silica-gel slurry whereupon the pH of the mixture was found to be 8.7. This mixture, which is referred to as a magnagel, was then aged for about 1½ hours at 160° F. This magnagel was then quickly cooled to room temperature and 520 g of 48% hydrogen fluoride (HF) solution was added. At this point, the pH of the mixture is 7.8. The batch was then filtered and the filter cake was reslurried with water, homogenized and then spray dried. The screen size of the spray dried product was primarily in the range of 200 mesh. The spray dried product was then washed with water, heated at 180° F. for about 3 to 4 hours, and subsequently washed 4 times with ammonium sulfate solution at a temperature of 110° F.

The dried, finished catalyst contained the following: MgO, 19.65 weight %; $Al_2O_3$, 13.10 weight %; $SO_4$, 0.10 weight %; and F, 1.83 weight %.

EXAMPLE 2

To prepare a comparison catalyst sample, the procedure in Example 1 was repeated, however, the kaolin ingredient was omitted. The analysis of the resulting catalyst was found to be as follows: MgO, 28.14 weight %; $SO_4$, 0.11 weight %; and F, 2.72 weight %.

EXAMPLE 3

The catalysts of Example 1 and 2 were then subjected to a thermal treatment which involved heating with 60 psig steam at 1050° F. for 24 hours in a fluid bed followed by heating 3 hours at 1550° F. The surface area and total pore volume of the products were taken subsequent to each thermal treatment. The results are tabulated below:

TABLE I

| Catalyst | Example 1 | Example II |
|---|---|---|
| Surface area (m²/g) | 236 | 298 |
|  | 0.38 | 0.59 |
| Pore volume (cc/g) | 0.51* | 0.69* |
| Davison Attrition | 26.8 | 16.8 |

*$H_2O$ Pore Volume

The above date indicates that the catalyst of the present invention (Example I) possesses a lower surface area and pore volume than the control catalyst (Example II). It should also be noted that the thermostability of the product of the present invention and attrition resistance is acceptable even though the product contains 30% by weight kaolin.

EXAMPLE 4

A. Hydrated calcined magnesium oxide (MgO) was prepared by combining 1670 g MgO (4.0% $H_2O$) with 5025 ml. of water at 150° F. After 1½ hours, 950 ml. of 39% $H_2SO_4$ solution was added.

B. A clay-silica gel slurry was prepared by combining 5060 g kaolin clay (14.1% $H_2O$) with 45 gallons of sodium silicate solution, which contained 13.0 g/l $Na_2O$ and 43 g/l $SiO_2$. This slurry was pumped at a rate of 1 gallon/min. through a heated reaction coil into which $CO_2$ gas was pumped at a rate such that gellation of the silicate occurred in 5 minutes at 125° F. The gelled slurry was aged for about 1 hour at 125° F. Next, 3305 ml. of 39% $H_2SO_4$ solution was added to obtain a clay-silica gel slurry which possessed a pH of 2.9.

C. The hydrated magnesia slurry prepared in A above was added to the clay-silica gel slurry obtained in B above. The temperature of the mixture was held at 150° F. for about 2 hours. The pH of this mixture was 8.35.

D. The reaction mixture of C above was agitated and 187 g of 49% HF solution was added. 15 minutes after the addition of HF solution was completed, 868 g of calcined rare earth exchanged type Y zeolite (CREY) slurry containing 33.5% solids was added. The resultant slurry was agitated for 1 hour then filtered. A 92 pound filter cake was obtained which was slurried with water and spray dried. The spray dried product was aged at 165° F. for 1 hour. This product was then washed with dilute ammonium sulfate solution four times at 110° F. The washed product was dried at 400° F. The analysis of the final product was as follows:

| | |
|---|---|
| $Al_2O_3$ | 14.03% |
| $Na_2O$ | 0.04% |
| $RE_2O_3$ | 0.72% |
| MgO | 17.72% |
| F | 1.22% |
| Surface Area (after 3 m at 1250° F.) - 383 m²/g | |
| Pore Volume - 0.58 cc/g ($H_2O$) | |
| Attrition - 31.2 Davison's Index | |

EXAMPLE 5

The catalytic cracking characteristics of the catalyst described in Examples 1, 2, and 4 are determined by first subjecting the catalyst to a deactivation procedure of Example 3, and then subjecting the catalyst to cracking conditions using a West Texas heavy gas oil at temperatures of 902° F. In the table below, the cracking characteristics of both samples are illustrated.

TABLE II

| Catalyst | Example 1 | Example 2 | Example 4 |
|---|---|---|---|
| Vol.% Conversion at 10 WHSV | 61.5 | 60.0 | 71.0 |
| $H_2$ (Wt. %) | 0.051 | 0.047 | 0.033 |
| $C_1$ and $C_2$ (Wt. %) | 1.8 | 1.7 | 1.7 |
| $C_3$ 's (Wt. %) | 6.8 | 5.9 | 8.6 |
| $C_4$ 's (Wt. %) | 8.1 | 7.1 | 8.5 |
| $C_5$ and gasoline (Wt. %) | 55.0 | 54.5 | 63.5 |
| Light Cycle Oil (Wt. %) | 16.5 | 16.7 | 13.5 |
| Coke (Wt. %) | 3.8 | 3.6 | 3.4 |

The above data clearly shows that the catalysts of the present invention (1 & 4) possess excellent activity even though considerable clay is present. Further, the catalysts show outstanding selectivity for light cycle oil.

We claim:

1. A process for converting hydrocarbons to lower boiling fractions in which gasoline and light cycle oils predominate which comprises contacting a hydrocarbon charge stock under catalytic cracking conditions with a catalyst comprising a synthetic silica magnesia catalyst containing from about 12 to 35 weight percent magnesia, 1 to 3 weight percent fluoride, 0.1 to 20 weight percent of a crystalline zeolite and 20 to 42 weight percent clay and recovering the product containing principally gasoline and light cycle oil fractions.

2. The process according to claim 1 wherein the hydrocarbons are cracked at a temperature of about 900° F and a weight hourly space velocity of about 10.

* * * * *